Figure 1:
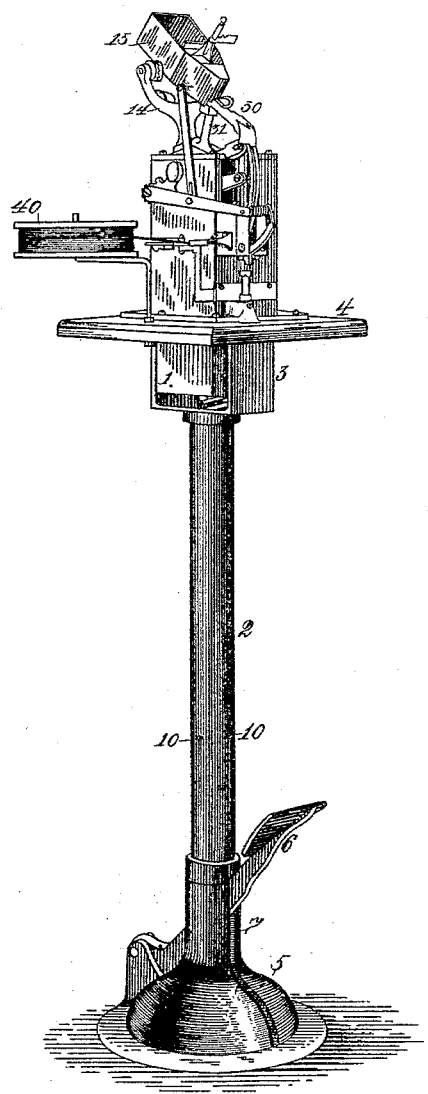

(No Model.)

9 Sheets—Sheet 1.

W. E. ELLIOTT.
BUTTON ATTACHING MACHINE.

No. 552,869.

Patented Jan. 7, 1896.

(No Model.) 9 Sheets—Sheet 3.
W. E. ELLIOTT.
BUTTON ATTACHING MACHINE.

No. 552,869. Patented Jan. 7, 1896.

Attest
S. W. Brainerd.
L. G. Briggs.

Inventor
William E. Elliott,
By J. M. St. John
Atty.

(No Model.) 9 Sheets—Sheet 4.

W. E. ELLIOTT.
BUTTON ATTACHING MACHINE.

No. 552,869. Patented Jan. 7, 1896.

Attest.
S. W. Brainerd.
L. G. Briggs.

Inventor.
William E. Elliott
By J. M. St. John
Atty.

(No Model.)  9 Sheets—Sheet 5.

W. E. ELLIOTT.
BUTTON ATTACHING MACHINE.

No. 552,869.  Patented Jan. 7, 1896.

Attest.
S. W. Brainerd.
L. G. Briggs.

Inventor.
William E. Elliott,
By J. M. St. John,
Atty.

(No Model.) 9 Sheets—Sheet 6.
W. E. ELLIOTT.
BUTTON ATTACHING MACHINE.
No. 552,869. Patented Jan. 7, 1896.

(No Model.) 9 Sheets—Sheet 7.

W. E. ELLIOTT.
BUTTON ATTACHING MACHINE.

No. 552,869. Patented Jan. 7, 1896

Attest
S. W. Brainerd.
L. G. Briggs.

Inventor
William E. Elliott,
By J. M. St. John,
Atty.

(No Model.) 9 Sheets—Sheet 8.
W. E. ELLIOTT.
BUTTON ATTACHING MACHINE.
No. 552,869. Patented Jan. 7, 1896.
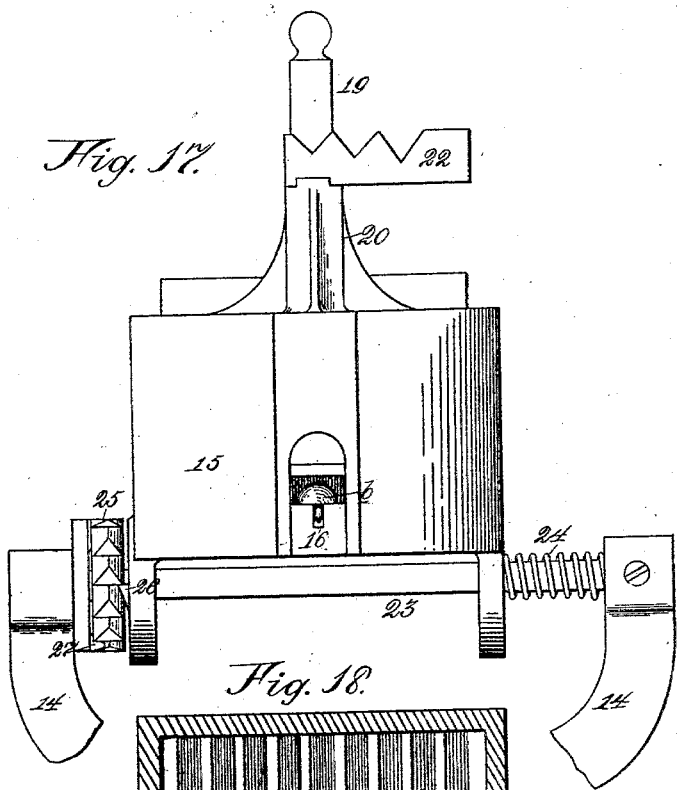
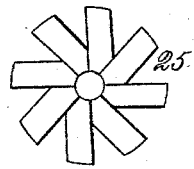
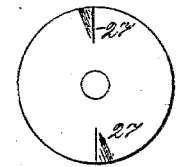

(No Model.)  9 Sheets—Sheet 9.

W. E. ELLIOTT.
BUTTON ATTACHING MACHINE.

No. 552,869. Patented Jan. 7, 1896.

Attest.
S. W. Brainerd.
L. G. Briggs.

Inventor.
William E. Elliott
By J. M. St. John,
Atty.

UNITED STATES PATENT OFFICE.

WILLIAM E. ELLIOTT, OF MARION, IOWA.

BUTTON-ATTACHING MACHINE.

SPECIFICATION forming part of Letters Patent No. 552,869, dated January 7, 1896.

Application filed September 30, 1889. Serial No. 325,600. (No model.)

*To all whom it may concern:*

Be it known that I, WILLIAM E. ELLIOTT, a citizen of the United States, residing at Marion, in the county of Linn and State of Iowa, have invented certain new and useful Improvements in Button-Attaching Machines; and I do hereby declare the following to be a full, clear, and exact description of the invention, such as will enable others skilled in the art to which it appertains to make and use the same.

My invention relates to machines for attaching buttons to fabrics; and it consists in the novel construction and operation of the button-hopper, in the novel construction and operation of the button and fastener-wire feeding mechanism, in the novel construction and operation of the fastener forming and clinching mechanism, in the novel driving mechanism employed for operating the various mechanisms of the machine from one common source of power, in the novel means employed for preventing an incomplete operation of this driving mechanism which otherwise might result in the clogging of the machine with partly formed or undriven fasteners, and in the novel combination, construction, and arrangement of the various parts of the machine, as hereinafter set forth.

The objects of my invention are, first, to provide a button-attaching machine capable of forming its own fasteners and of attaching buttons thereby to the fabric, and which shall be more simple and reliable than the button-attaching machines heretofore employed; second, to provide an improved button-hopper for containing the buttons, which shall be so constructed that clogging in the button-hopper may be prevented, and which shall always present the buttons to the button-feeding mechanism in the proper position; third, to provide improved button and fastener-wire feeding mechanisms, and to so construct the wire-feeding mechanism that buckling of the fastener-wire in the staple-former may be avoided; fourth, to provide a simple driving mechanism for operating the button and wire feeding and fastener forming and driving devices of the machine from one common source of power; fifth, to provide means for clinching a fastener by the direct movement of the driving mechanism; sixth, to provide an improved locking device for preventing an incomplete operation of the driving mechanism of the machine, so that the machine may not become clogged by partly-formed or undriven fasteners, and, seventh, to make the machine strong, compact, simple, easily operated, not liable to derangement, certain in action, and as inexpensive as possible. These objects are attained in the button-attaching machine herein described and illustrated in the drawings which accompany and form a part of this application, in which the same reference letters and numerals indicate the same or corresponding parts, and in which—

Figure 2:
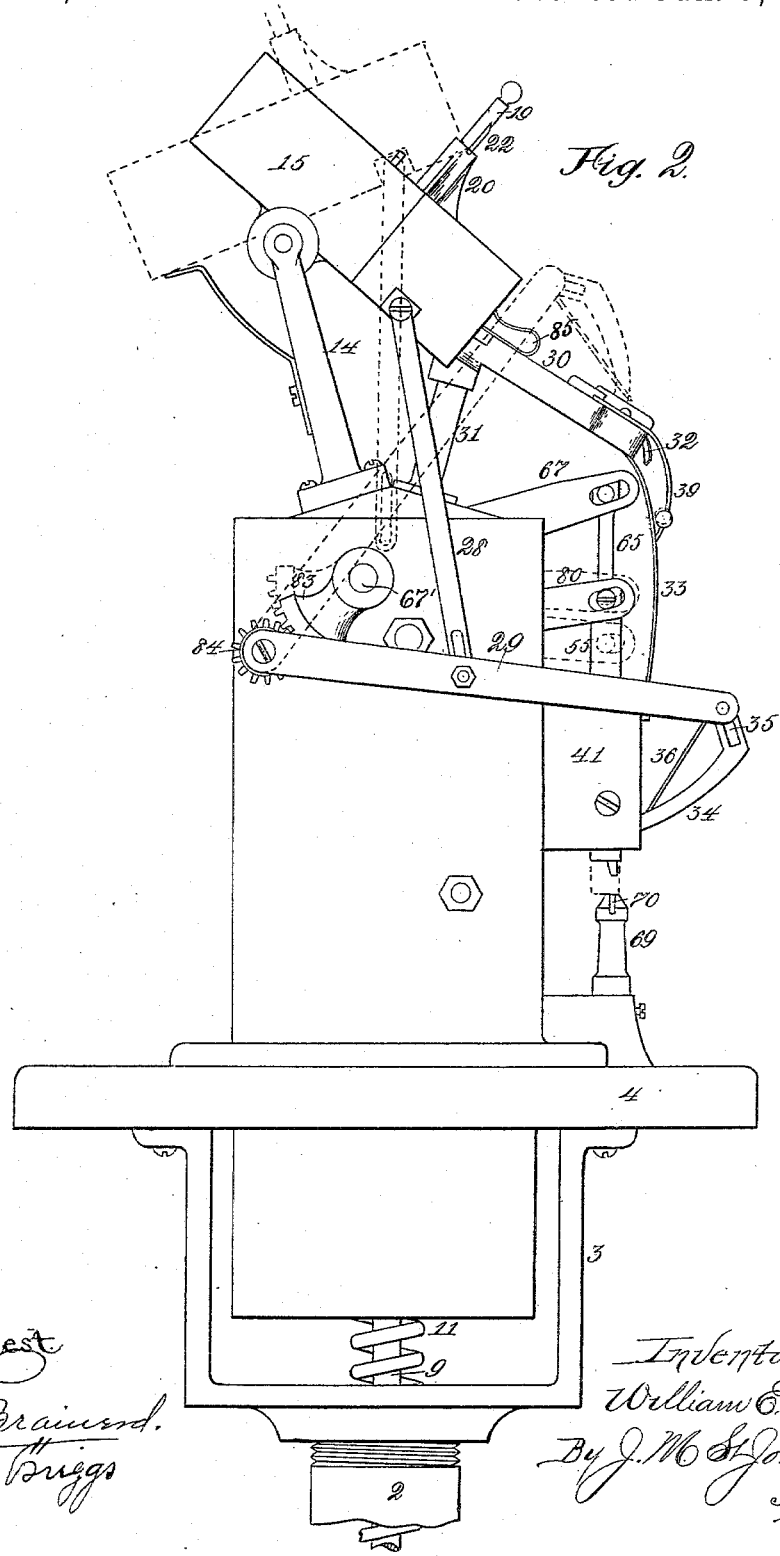
Figure 3:
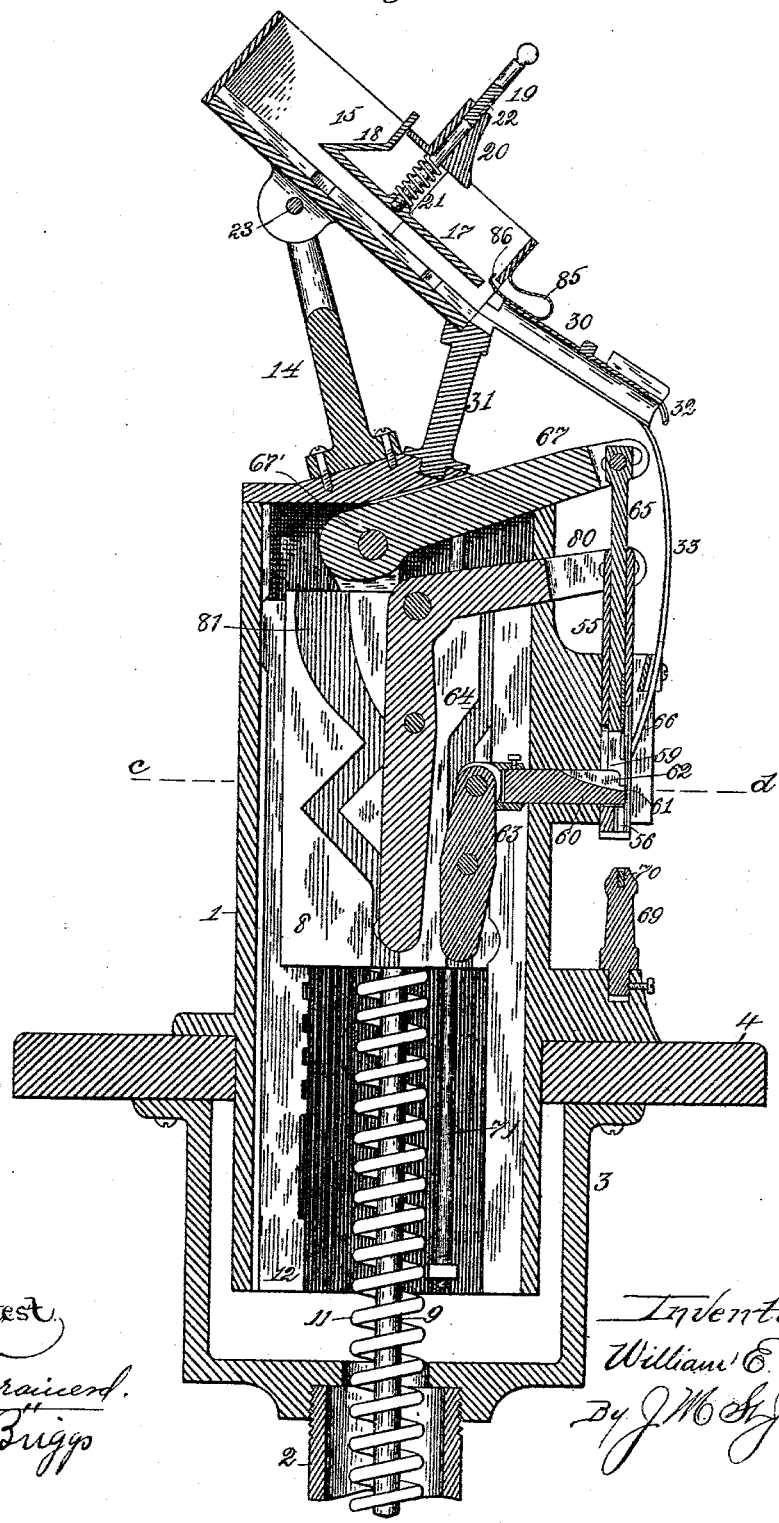
Figure 4:
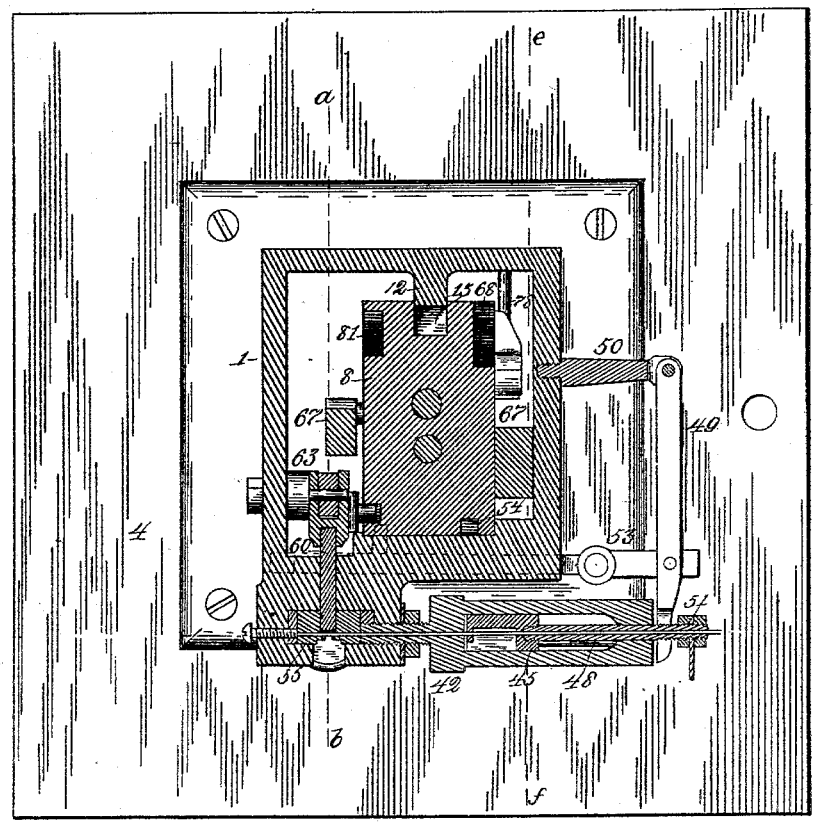
Figure 5:
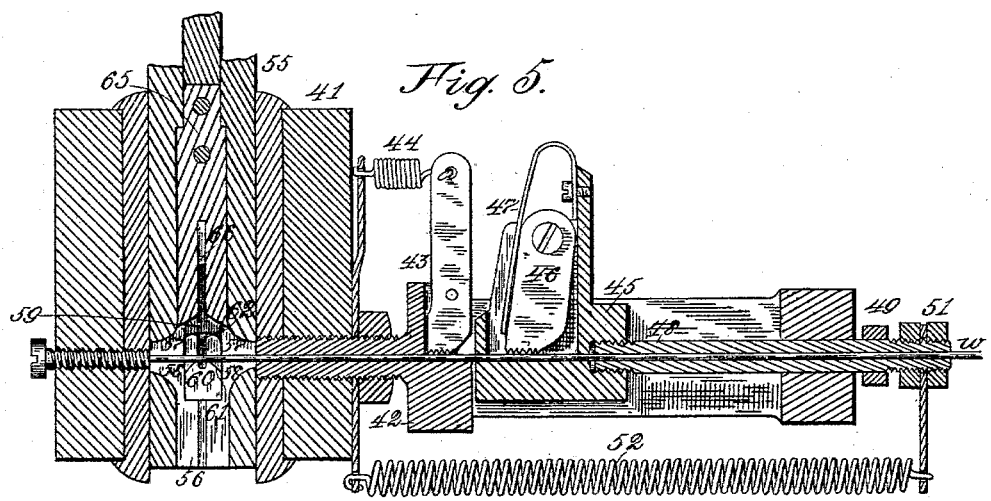
Figure 6:
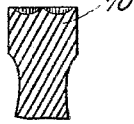
Figure 7:
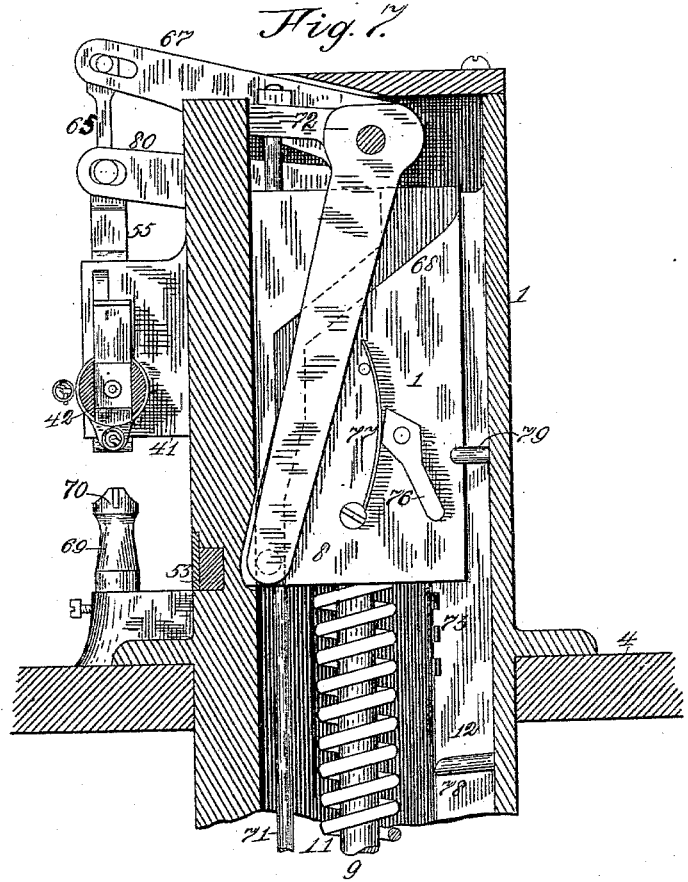
Figure 8:
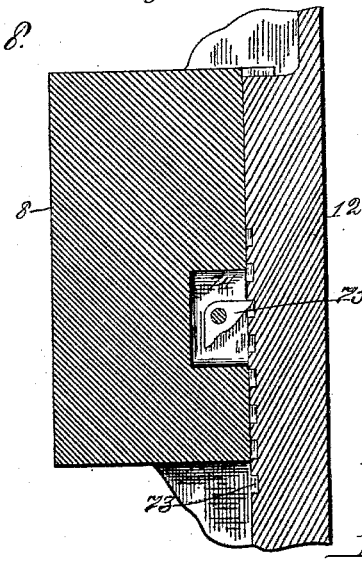
Figure 9:
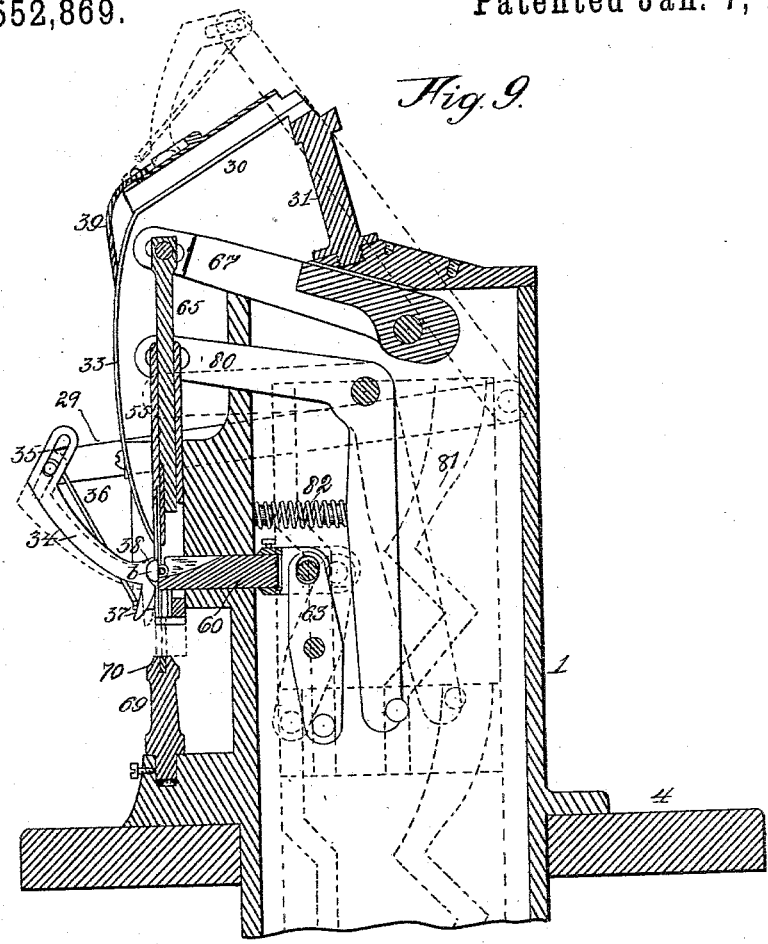
Figure 10:
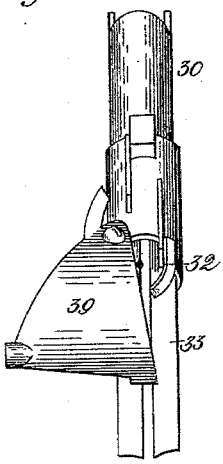
Figure 11:
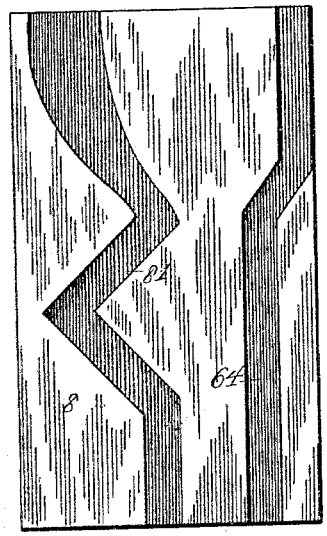
Figure 12:
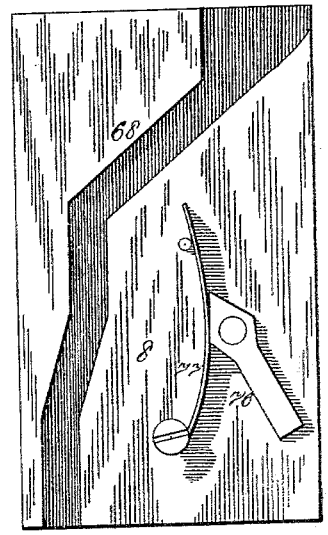
Figure 13:
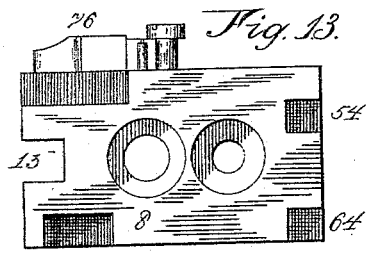
Figure 14:
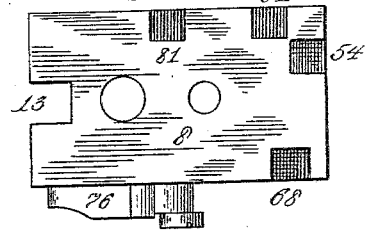
Figure 15:
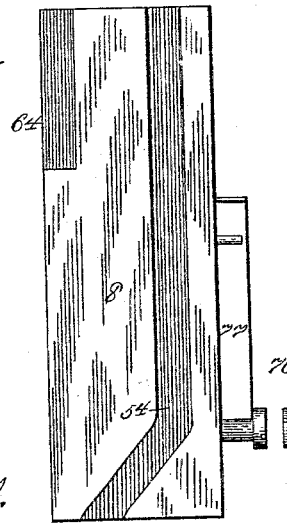
Figure 16:
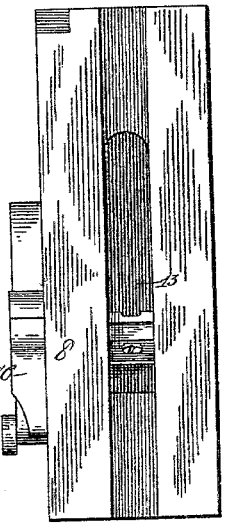
Figure 21:
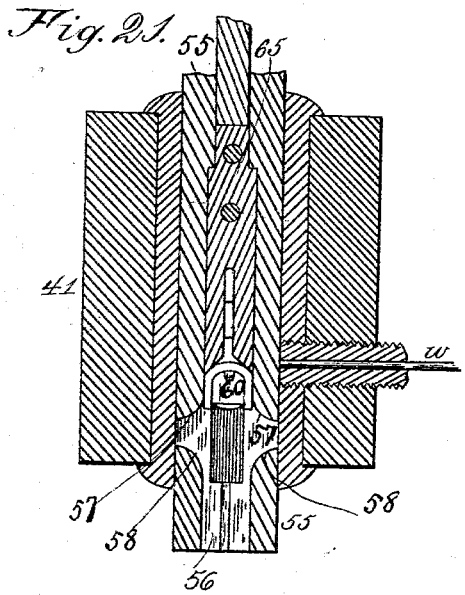
Figure 23:
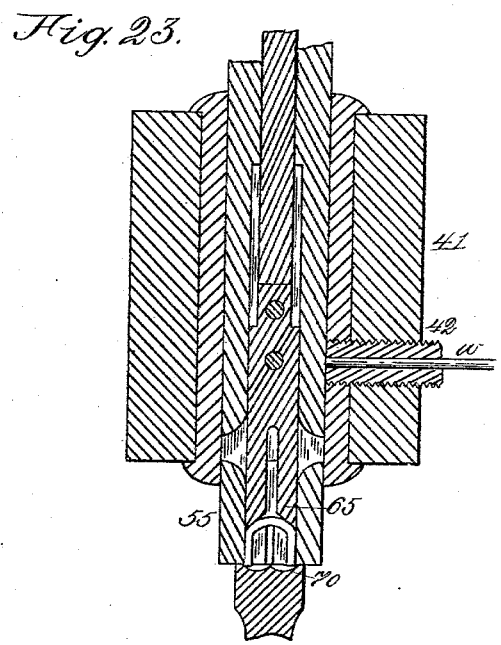
Figure 22:
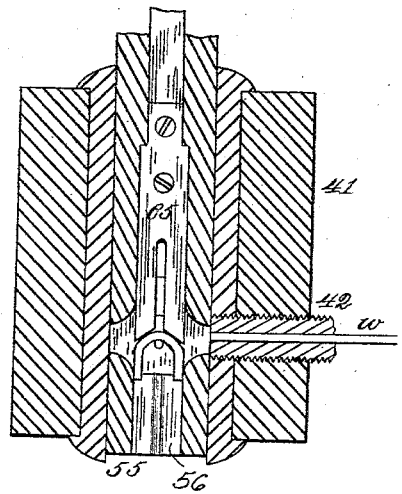

Figure 1 is a side perspective elevation of the machine. Figure 2 is a side elevation of the upper or principal portion of the machine. Fig. 3 is a vertical section of the upper portion of the machine, taken on the line $a\,b$ of Fig. 4—that is, through the center of the button-hopper. Fig. 4 is a sectional plan view of the upper portion of the machine, the section being taken on the line $c\,d$ of Fig. 3. Fig. 5 is a central longitudinal section of the wire-feeding device and the parts connected therewith. Fig. 6 is a central sectional view of the clinching-die. Fig. 7 is a vertical section of the upper part of the machine, taken on the line $e\,f$ of Fig. 4. Fig. 8 is a central vertical section of the cam-block and the rear side of the inclosing-shell, showing the locking device employed for preventing an incomplete stroke of the cam-block. Fig. 9 is a vertical section of the shell, taken on the same line $a\,b$ of Fig. 4 upon which the section-line of Fig. 3 is taken, showing the arrangement of the levers and the connected parts and the operation thereon. Fig. 10 is a fragmentary front elevation of the button-chute. Fig. 11 is an elevation of the left side of the cam-block, the right under line being considered as the front. Fig. 12 is a side view of the same. Figs. 13 and 14 are top and bottom plan views, respectively. Figs. 15 and 16 are front and rear views, respectively, of this cam-block. Fig. 17 is a front elevation of the button-hopper. Fig. 18 is a plan view of the same. Figs. 19 and 20 are detail views of the cam device for imparting lateral movement to the hopper, and Figs. 21, 22, and 23 are vertical sections of the staple-forming device in different positions.

In the drawings, 1 is the metal box or shell which incloses the cam-block, to be hereinafter mentioned, and to which the bell-cranks and levers which operate the various parts of the machine are pivoted.

2 is a tubular standard having at its lower end a base 5 and at its upper end a bracket 3 and table 4, from which table the box or shell 1 is supported.

Within the shell 1 is the cam-block 8. (Best shown in Figs. 3, 4, and 8, and in the detail views, Figs. 11, 12, 13, 14, 15, and 16.) This cam-block is free to slide up and down in the casing 1, a guide 12 forming part of the shell 1 and fitting into a groove 13 in the back of the cam-block serving to guide it in this upward and downward movement. The cam-block has in its front and sides cam-grooves of various forms, and in these grooves work pins, which pins are attached to the ends of the bell-cranks and levers which operate the various parts of the mechanism of the machine. The cam-block is thus the means of transmitting motion to all the parts of the mechanism of the machine, and the shape of its grooves determines the time and amplitude of movement of all of the parts of the machine. The cam-block is moved downward by means of a rod 9 attached to its lower end, the rod passing downward through the standard 2, and having its lower end attached to a pivoted foot-lever 6, which passes through a slot in the base 5. The downward pressure of the foot-lever 6 pulls down the cam-block 8, and a spring 11, surrounding the rod 9 and bearing against the bottom of the cam-block, serves to raise the cam-block to its first position when the foot-lever 6 is released.

The plan of operation of the machine is to take a button from the button-hopper and carry it down to the staple-forming mechanism, where it is firmly held while the end of a wire is passed through its eye, the wire being then cut off at the proper length and formed into a staple, which is then driven through the fabric and clinched. In carrying out these operations the fabric to which the buttons are to be affixed is placed upon the anvil 69, Fig. 2, the spot at which it is desired to affix a button being placed directly over the center of the clinching-die 70, to be hereinafter mentioned. Depressing the foot-lever 6 causes the feed-finger 34, the operation of which will be more fully hereinafter described, to rise, take a button from the button-chute 30, which is in communication with the button-hopper 15, and carry it down into the position shown in Fig. 9, where it is held while wire from a reel attached to the machine is fed through the eye of the button by the mechanism shown in Fig. 5, the proper amount of wire being then cut off by the descent of the staple-former 55 and formed into a staple, which is then driven through the fabric and clinched.

Referring now to Figs. 2, 3, 17, and 18, 15, as before stated, is the button-hopper, which forms the receptacle from which the buttons to be affixed are taken. This button-hopper is pivotally supported on trunnions 14, attached to the top of the shell 1, and is provided with an agitating or shaking device for shaking the buttons, so as to cause them to take an upright position, through the action of means to be hereinafter described, and to permit them to feed out of the button-hopper. This agitating device will be hereinafter described. The button-hopper is caused to swing up and down about its pivot when the foot-lever 6 is depressed and raised, by means of a link connecting the button-hopper and swinging-lever 29, which lever receives its motion from the cam-block 8 by means to be hereinafter described.

The button-hopper is formed as shown in Figs. 1 and 18, being generally rectangular in shape, but with its sides converging at one end. In order to insure that all of the buttons shall be carried to the staple-forming mechanism in such a position as to permit of feeding the wire through the eyes of the buttons, it is necessary that each button shall be delivered in an upright position from the button-hopper to the button-chute 30, and thence to the feed-finger 34; and to accomplish this the bottom of the button-hopper is formed with the grooves 16, Fig. 18, deeper than the length of the shanks of the buttons and somewhat narrower than the breadth of the shanks, and as the button-hopper rises and falls, and is shaken from side to side through the action of the agitating mechanism, the buttons tend to arrange themselves in an upright position, the shanks lying within and lengthwise of the grooves, and the further movement of the button-hopper causes the buttons to slide down these grooves, which unite near the narrow end of the hopper into one groove which leads to the mouth of the hopper. The buttons are prevented from passing out of the mouth of the hopper, except in the manner to be hereinafter explained, by a U-shaped spring 85, Figs. 2 and 3, fastened to the front of the button-hopper, one leg of this spring having an upturned end 86, which, when in its normal position, closes the opening in the front of the hopper sufficiently to prevent the buttons from passing out.

In order to make it impossible for the buttons to be forced up out of the grooves, when once they have reached the proper position within said grooves, and to prevent any buttons which have not as yet taken the proper position from passing to the mouth of the button-hopper, thus clogging the mouth of the hopper, I provide the plate 17, Fig. 3, which is so supported as to be parallel with the bottom of the hopper. This plate is supported by an upwardly-projecting rod or stem 19, which passes through a hole in the bridge 20, which latter is secured to the sides of the hopper, and a spring 21 tends to press the plate 17 down against the heads of the buttons.

A sliding plate 22, Fig. 17, having notches of varying depths adapted to engage with a tooth forming part of the stem 19, serves as a means for adjusting the height of the plate 17 above the bottom of the hopper 15, this adjustment being required in order to allow for different sizes of buttons. The plate 17 is adjusted at such a height above the bottom of the button-hopper that while buttons the shanks of which are within the grooves pass freely under it, there is not sufficient space between the plate and the heads of the buttons to permit the buttons to rise out of their grooves, or to permit a button which is not in an upright position with its shank entirely within the groove to pass under the plate. The rear end of the plate 17 is turned upward, and forms the front wall of the button-magazine—that is, the compartment into which the buttons are poured when charging the machine.

30 is the button-chute, supported on the pedestal 31. Its rear registers with the mouth of the button-hopper 15 when the latter is in its extreme downward position. When the button-hopper swings downward, the spring 85 strikes the top of the chute 30 and its end 86 is raised sufficiently to free the button at the mouth of the button-hopper and permit it to slide into the chute 30, the bottom of which is slotted to correspond with the groove in the bottom of the button-hopper, and thence to the end of the chute 30, where it is caught and held by a projecting spring 32. (Shown in Figs. 2, 3, and 10.) From this end of the chute a guide 33, slotted to correspond with the bottom of the chute, leads to the staple-forming mechanism, and down this guide the button is carried at the proper time to a position where wire from a reel attached to the machine is fed through the eye of the button and formed into a staple.

The swinging lever 29, Fig. 2, is mounted on a pivot near the rear of the shell 1. It has secured to it a pinion 84, intermeshing with a toothed segment 83, mounted on and receiving its motion from the pivot 67' of the bell-crank 67, Fig. 7, to which bell-crank the pivot is keyed. The lower arm of the bell-crank 67 carries a projecting pin working in the groove 68 of the cam-block 8. The bell-crank 67 likewise operates a portion of the staple-forming and driving mechanism, as will be seen hereinafter. It will be observed that the use of the segment 83 gives a reverse movement to the lever 29, which moves up when the cam-block moves down, and vice versa.

The feed-finger 34 is pivotally connected to the lever 29, the pivot passing through a slot 35 in the finger, the purpose of which will be apparent hereinafter. The feed-finger 34 is situated directly over the slotted guide 33, and as the lever 29 rises, the lower end or heel of the finger 34 slides over the guide. As shown in Fig. 10, the spring 32 is so placed as to hold the button in the slot of the guide 33 just without the chute 30, and in order to prevent the finger 34 from striking and pushing back the button when rising a guide-plate or "gravity-gate" 39 is provided. This gravity-gate is a curved sheet of metal having a substantially triangular shape, and is pivoted at the side of the chute 30. One corner of the gate is provided with a weight, which causes the gate to swing across the guide 33, so that when the feed-finger 34 in rising strikes the gate it will be carried up over the button, which, as before stated, is held at the mouth of the chute 30 by the spring 32, and to the top of the chute 30. The lower side of the heel of the finger 34 is provided with a recess of suitable form for receiving the head of the button, and as the lever 29 and finger 34 swing down again the finger catches the button in this recess and carries it down to the bottom of the guide 33, pushing aside the spring 32 and gravity-gate 39, and carrying the button down into the position shown in Fig. 10, its shank fitting into a vertical groove in the front of the staple-forming die 60. (Best shown in Fig. 5.)

As before stated, the pivot which connects the finger 34 and lever 29 passes through a slot 35 in the finger 34. A spring 36 tends to hold the finger in the position shown by dotted lines in Fig. 9 with the pivot at the top of the slot 35. The arm 29, however, has a slight downward movement after the button has reached its seat, thus moving the pivot to the bottom of the slot 35, rocking the finger 34, and pressing the button firmly into its seat. The feed-finger remains in this position and holds the button in place until after the wire from which the staple is formed has been fed through the eye of the button, so that it is not possible for the button to fall out of its position after it has reached its seat in the staple-forming die.

The staple-forming mechanism is placed within the head-block 41, which forms a part of the shell 1, and the wire-feeding mechanism is attached to the side of this head-block. This wire-feeding mechanism, which will be next described, is best shown in Figs. 4 and 5, and particularly in Fig. 5. Its construction is as follows:

42 is a stud, one end of which is screwed into the side of the head-block 41. Through the center of the stud is a longitudinal aperture, which forms a wire-passage through which the wire $w$ from which the staple is formed is fed to the staple-forming mechanism. The inner end of the stud abuts against the side of the staple-former 55, and therefore, as will be seen hereinafter, the edge of the wire-passage in the stud serves as one of the cutting-edges which cut the wire in forming the staple. For this reason the stud 42 should be made of hard steel.

43 is a pivoted dog carried by the stud and provided with teeth on its lower end, which engage with the wire, the spring 44 serving to hold the dog firmly against the wire. The teeth of the dog 43 are so formed as to offer no resistance to the inward passage of the wire, but to make it impossible for the wire to draw back. Through the outer end of the stud 42 passes a stem 48, likewise provided with a central longitudinal wire-passage and having secured to one end the block 45, which block likewise carries a pivoted dog 46, having teeth adapted to engage with the wire $w$, and being provided with a spring 47, which presses the dog firmly against the wire. The stem 48 is free to slide back and forth in its bearing in the stud 42, carrying with it the block 45 and dog 46. The teeth of the dog 46 are so formed that they do not grasp the wire during the backward movement of the stem and block 45, but on the forward movement the teeth of the dog grasp the wire and feed it in through the passage in the stud 42 to the staple-forming mechanism. When the stem 48 and block 45 move back again for a fresh grasp on the wire, the wire is held from springing back by the dog 43. To the end of the stem 48 is secured a finger 51, and to this finger is attached a spring 52, the function of which is to draw the stem inward. The stem is pulled out again by the pivoted lever 49, to which is attached the rod 53, which passes through an opening in the shell 1 and is provided with a pin which works in the slot 54 of the cam-block 8.

The object of feeding the wire in by the action of the spring 52 rather than by a positive means is to avoid buckling of the wire in case the shank of the button should be defective to such an extent that the wire will not pass through the eye. If a positive wire-feed were used the wire would buckle within the head-block, causing great inconvenience. By feeding the wire by means of a spring I avoid all danger of buckling.

The wire-reel is so placed on the machine that the curvature of the wire, a tendency to which exists owing to the wire having been wound on the reel, is entirely within a horizontal plane, so that there is no danger that the wire will bend up or down after it enters the head-block 41 and so fail to enter the eye of the button. Its tendency is to curve in a horizontal plane toward the rear of the machine, but since the groove in the staple-former 55, to be hereinafter mentioned, is only slightly greater than the diameter of the wire no great amount of curving can occur nor can the wire fail to enter the eye of the button.

The staple-forming mechanism is best shown in Figs. 5, 21, 22, and 23. 55, the staple-former, is a rectangular block fitted into a vertical groove 56 in the head-block 41 and free to slide therein. This groove is somewhat deeper than the diameter of the wire from which the staple is formed, and at one point opens out at the sides, forming the shoulders 57 and 58, one of the shoulders 57 serving as one of the cutting-edges which cut the wire $w$ in forming the staple, the edge of the wire-passage in the stud 42 forming the other cutting-edge, as previously stated. In the rear of the staple-former 55 is a vertical slot, through which the front end of the staple-forming die 60 projects. As previously stated, the front of the die 60 is provided with a central vertical groove, which receives and holds the shank of the button. The front of the die 60 likewise has a projecting lip 61 rounded on top and grooved horizontally to receive the lower side of the button-shank. Over this lip 61 the fastener-wire is bent by the staple-former 55 in forming the staple. The die 60 is mounted in suitable bearings in the head-block, so as to be capable of sliding backward and forward, and at its rear end it is connected with a pivoted arm 63, Fig. 3, which carries a pin working in a slot 64 in the side of the cam-block 8.

The staple-former 55 is moved up and down in its bearing in the head-block 41 by a bell-crank 80, to one arm of which it is pivotally attached, and the other arm of which carries a pin which works in the groove 81 of the cam-block 8. Mounted within the vertical groove in the staple-former 55 and adapted to slide up and down in said groove is a plunger 65, having its lower end formed to correspond with the top of the staple, and provided with a central vertical slot of such size as to receive the shank of the button when the plunger descends, and to prevent the shank from being crushed during the driving and clinching operations. This plunger is moved up and down by the bell-crank lever 67, previously mentioned, to one arm of which it is pivotally attached, the other arm of the bell-crank carrying a projecting pin which works in the groove 68 of the cam-block 8, as previously mentioned.

In forming the staple, the staple-former 55 first descends, cutting off the wire from which to form the staple, and the shoulders 57 bend the wire over the projecting lip of the staple-forming die 60, the plunger 65 moving downward far enough to strike the top of the wire, hold it fast to the die 60, and form the top of the staple. When the plunger moves down, the shank of the button slips into the central vertical slot in the plunger, being thus held at the top of the staple and saved from being crushed by the plunger in its descent. The parts are now in the position shown in Fig. 21. The former 55 then rises, its lower shoulders catching the ends of the staple and pressing them close against the sides of the die 60, placing the parts in the position shown in Fig. 22. The die 60 is then drawn back by the action of the lever 63 and the plunger 65 descends, thrusting the staple through the fabric and against the clinching-die 70, (shown in detail in Fig. 6,) which, as before stated, is located in the top of the anvil 69. The staple-former 55 likewise descends with the plunger 65 until it strikes the fabric, thus acting to guide the staple and preventing it from upsetting during the clinching operation. The pressure of the legs of the staple against the sides of the groove in the staple-former likewise keeps the staple straight during its descent and prevents it from dropping away from the plunger 65. The parts are now in the position shown in Fig. 23.

Since the thickness of the fabrics to which the buttons are to be attached varies greatly, it is necessary to provide some means for adjusting the stroke of the staple-former to different thicknesses of fabric. To this end, the groove 81 in the cam-block 8, which controls the movement of the bell-crank lever 80 and staple-former 55, is enlarged at the top, and a spring 82, Fig. 9, pressing against the lower arm of the bell-crank 80, is provided. This spring tends to press the staple-former down upon the fabric independently of the pin working in the groove 81, and the widening of the groove 81 at the top permits of perfect freedom in this motion. Further pressure of the plunger on the top of the staple causes the ends of the staple to be turned under by the clinching-die, thus clinching the staple. Since the clinching is the portion of the operation of the machine requiring the most pressure, and since it is desirable that the ends of the staple shall be turned well over against the under side of the fabric, I have thought it best to have the clinching done by the direct action of the foot-lever without the intermediation of grooves in the cam-block and pins working therein. For this reason I provide the rod 71, which passes through a vertical passage in the cam-block and through a hole in a projecting flange 72 of the bell-crank 67, both ends of the rod being provided with nuts, one of which engages with the bottom of the cam-block and the other with the projecting flange of the bell-crank 67. When the cam-block has nearly reached the end of its travel downward, it strikes the nut on the lower end of the rod 71, thus pressing down the plunger 65 by the direct action of the foot-lever 6, the upper portion of the groove 68 being broadened to permit of perfect freedom in this motion.

The means for agitating or shaking the button-hopper 15 is shown in Figs. 17, 18, 19, and 20. The hopper is mounted on a shaft 23 supported by the trunnions 14, and mounted on the shaft 23 between the side of the hopper and one of the trunnions is a cam-wheel 25, provided with V-shaped projections, as shown. On the faces of the hopper and trunnion adjacent to the wheel 25 are corresponding lugs or projections 26 and 27, which engage with the projections of the wheel 25. The spring 24 forces the hopper against the wheel 25, and as the hopper swings up and down the projections of the hopper and trunnion, in passing over those of the wheel 25, impart a side-to-side motion to the hopper, by which the buttons contained therein are thoroughly agitated or shaken.

The operation of this button-attaching machine is as follows: Supposing the foot-lever to have been depressed, thereby raising the hopper 15, when the pressure of the foot is removed from the foot-lever the spring 11 raises the foot-lever and cam-block 8, and causes the button-hopper to swing down, and when the spring 85 strikes the end of the button-chute 30 its upturned end 86 will be raised, releasing the button at the mouth of the button-hopper and permitting it to slide into the button-chute and thence to the end thereof, where it is caught and held by the spring 32. When the foot-lever is again depressed, the lever 29 is raised, carrying with it the feed-finger 34, which is guided by the gravity-gate 39 up over the button to the top of the button-chute 30. When the foot-lever again rises, the lever 29 descends, as does the feed-finger 34, the button catching in the heel of the feed-finger. In descending the feed-finger pushes aside the spring 32 and the gate 39 and carries the button down the guide 33, the shank of the button sliding in the slot in the said guide until the staple-forming mechanism is reached, when the shank of the button enters the groove in the front of the staple-forming die 60, and by the rocking of the feed-finger 34, due to the further descent of the lever 29, the button is firmly pressed into its seat. The rod 53, through the action of the groove 54 in the cam-block and the pin working therein, is drawn inward, permitting the spring 52 to draw in the stem 48 and block 45, thus feeding the wire forward through the eye of the button. When the foot-lever is again depressed the rod 53 is pushed outward, thus pushing out the lever 49 and the stem 48 and block 45, the dog 43 holding the wire fast. An instant after the cam-block 8 begins to descend, the staple-former 55 is carried down by the bell-crank lever 80, which is caused to swing by the pin working in the cam-groove 81 of the cam-block 8. The plunger 65 is likewise moved downward slightly by the bell-crank 67, being moved far enough to hold the staple down firmly on the staple-forming die 60, and so to form the top of the staple. As the staple-former 55 descends, it cuts off the wire at the end of the stud 42, and the shoulders 57 bend the part cut off over the die 60, thus forming the staple. The staple-former 55 then rises, the staple-forming die 60 is drawn back by the lever 63, and the plunger 65 is carried down by the bell-crank lever 67, through the action of the cam-groove 68 and the pin working therein, thus thrusting the staple through the fabric and bringing the ends against the clinching-die 70. The staple-former 55 likewise descends and guides the staple during the driving and clinching operations, the spring 82 pressing it down upon the fabric. At this moment the cam-block 8 strikes the nut on the end on the rod 71, Fig. 6, thus bringing the pressure of the foot on the foot-lever 6 directly upon the lever 67 and forcing the plunger 65 down, thus clinching the staple. When the foot is removed from the foot-lever 6 the cam-block 8 is forced up by the spring 11, the plunger 65 and staple-former 55 rise, the staple-forming die 60 is thrust forward, the feed-finger 34 descends, carrying with it another button, the shank of which is firmly pressed into the groove in the front of the die 60, wire from the reel is fed through the eye of the button preparatory to being cut off and formed into a staple, and another button is released from the button-hopper 15 and allowed to slide into the button-chute 30. All of the operations of the different parts of the machine occur every time that the foot-lever is depressed and released.

When carelessly operated, it might happen that the operator would depress the foot-lever 6 only part of the full distance of its travel, or would permit it to rise through only part of the proper distance, and this would result in the clogging of the machine, since only a portion of the operation of forming the staple and affixing the button would be completed. To prevent any such clogging, I provide a locking mechanism (shown in Figs. 7 and 8) which makes it impossible for the cam-block to rise again, if depressed, until it has been depressed through the entire distance of its travel, or to be depressed again after it has risen until it has risen through the entire distance of its travel. This locking mechanism consists of a double ratchet or dog 75 located within a recess 74 in the rear of the cam-block, and adapted to engage with notches 73 in the edge of the guide 12. This ratchet 75 is secured to a short shaft passing through the cam-block, to which shaft the tumbler 76 is also secured. One end of this tumbler is adapted to engage with two lugs, 78 and 79, the one placed near the lowest point in the travel of the cam-block, the other located near the highest point in the travel of the cam-block. As shown in Figs. 8 and 9, the cam-block is descending, and, as will be seen, the ratchet 75 is in such a position as to permit of the free descent of the cam-block, but to make ascent impossible. When the end of the tumbler 76 strikes the tumbler 78, it is turned, together with the ratchet 75, so as to permit of the upward movement of the cam-block but to make downward movement of the same impossible, and when, in the upward movement of the cam-block, the tumbler strikes the lug 79, the ratchet will be again reversed, so as to permit of downward movement of the cam-block but to prevent any upward movement. A spring 77 bearing against the end of the tumbler serves to hold it steady and to prevent it from being disturbed by shock or jar to the machine.

I do not claim broadly in this application the adjustable plate superposed over the bottom of the button-hopper and arranged to keep the buttons within the grooves in the bottom of the hopper, as the same plate is used in the machine disclosed in another application of mine filed November 5, 1889, Serial No. 329,377, and is claimed broadly in that application. The claims in this application relating to the said plate are confined to features wherein the machine of this application differs from the machine of the aforesaid application, Serial No. 329,377.

Having thus completely described my button-attaching machine, its construction, and operation, what I claim, and desire to secure by Letters Patent, is—

1. In a button attaching machine, the combination, with a button hopper pivotally supported, of means for causing said button hopper to vibrate up and down about its pivot, and cams engaging the said button hopper, whereby, as it vibrates up and down it is likewise given a side to side vibration, substantially as described.

2. In a button attaching machine, the combination, with the trunnions 14 and shaft 23, of the button hopper 15 mounted on said shaft, means for swinging the button hopper about said shaft, the cam wheel 25 mounted on said shaft 23 between the side of the button hopper and trunnion 14 and provided with V-shaped projections, corresponding projections engaging therewith on the faces of said button hopper and trunnion adjacent to said cam wheel 25, and the spring 24 for holding the projections of the button hopper 15, cam wheel 25, and trunnion 14 together, whereby, as the button hopper is swung up and down it is likewise given a side to side motion, substantially as described.

3. In a button attaching machine, the combination, with a button hopper having a grooved bottom, of a superposed adjustable and spring-pressed plate, substantially as described.

4. In a button attaching machine, the combination, with a button hopper having a grooved bottom, of a superposed and spring-pressed adjustable plate, which is disconnected from and covers a portion of said bottom, substantially as described.

5. In a button attaching machine, the combination, with a button hopper having a grooved bottom formed with a series of converging grooves, of a superposed adjustable and spring-pressed plate, which is disconnected from and covers a portion of said bottom, substantially as described.

6. In a button attaching machine, the combination, with suitable agitating mechanism, of a button hopper having in its bottom a series of grooves converging to a single terminal groove and adapted to receive the shanks of the buttons, and an adjustable and spring-pressed plate covering the lower or outlet portion of said bottom, substantially as described.

7. In a button attaching machine, the combination, with a button hopper, of a superposed plate provided with a stem mounted in a bridge carried by said button hopper, and an adjusting device engaging said stem for regulating the height of said plate above the bottom of the hopper, substantially as described.

8. In a button attaching machine, the combination, with the button hopper 15 carrying the bridge 20, of the plate 17 superposed over the bottom of said button hopper and provided with the stem 19 having a bearing in said bridge 20, the spring 21 tending to press said plate 17 downward, and the variably notched plate 22 engaging with a tooth carried by the stem 19, whereby the height of the plate 17 above the bottom of the hopper 15 is adjusted, substantially as described.

9. In a button attaching machine, the combination, with the button hopper 15, of the plate 17, the chute 30, and the spring 85 adapted, when the hopper is raised, to hold the buttons from escaping therefrom, substantially as described.

10. In a button attaching machine, the combination, with a button hopper and means for causing said button hopper to be vibrated up and down, of the button chute 30 registering with the mouth of the button hopper when the latter is in the extreme downward position, the spring 85 for closing the mouth of the hopper when not in communication with the chute 30, and the spring 32 for holding the buttons at the mouth of the button chute, whereby the buttons are carried from the button hopper to a position from whence they may be fed to the button attaching mechanism, substantially as described.

11. In a button attaching machine, the combination, with a button feed finger, button chute, and a guide, of a laterally swinging gravity gate adapted to carry said finger up over the end of said chute to a position for engagement with the button held at the mouth of said chute, and to open for the passage of each button in the return movement of said feed finger, substantially as described.

12. In a button attaching machine, the combination, with the feed finger 34 having the slot 35, of the swinging lever 29 pivotally attached to said feed finger, the pivot passing through the slot 35, and the spring 36 normally holding the pivot at the top of the slot 35, whereby, as the lever 29 descends after the button has reached its seat in the button attaching mechanism, the feed finger 34 is caused to rock, thereby pressing the button firmly into its seat, substantially as described.

13. In a button attaching machine, the combination, with a foot lever or other suitable means for operating the machine, of a cam block suitably guided, means for causing said cam block to be reciprocated by the motion of the foot lever, levers pivoted to the frame of the machine and carrying pins working in cam grooves in the faces of said cam block, whereby said levers are caused to oscillate when the cam block reciprocates, and staple forming and button attaching mechanism actuated thereby, substantially as described.

14. In a button attaching machine, the herein described wire feed, consisting essentially of the longitudinally perforated stud 48, having the spring actuated dog 46, the vertically reciprocating cam block 8 having the groove 54, the connecting rod 53, and the swinging arm 49 engaging with said wire feed, substantially as described.

15. In a wire feeding mechanism, the combination, with the stud 42 and the stem 48 having a bearing therein, of a spring 52 for drawing said stem inward, a pivoted lever 49 actuated by a pin working in a groove of the cam block 8 for drawing said stem 48 outward, a dog carried by the stem and adapted to grasp the wire during the inward movement of the stem, and means for preventing said wire from springing back during the backward movement of the stem 48, substantially as described.

16. In a button attaching machine, the combination, with the lever 29, the button feed finger 34 pivoted thereto and having in its upper end the slot 35 and in its lower end a recess adapted to receive the button, and the spring 36, of the staple forming die 60 adapted to hold the shank of the button, and means for operating said lever 29, whereby said finger 34 is caused to carry buttons to the die 60 and seat them there in position to permit of fastener wire being fed through their eyes, substantially as described.

17. In a button attaching machine, the combination, with the horizontally reciprocating die 60, of the lever 63 and the vertically reciprocating cam 8 having the cam groove 64, substantially as described.

18. In a button attaching machine, the combination, with the die 60 having the projecting lip 61 and the groove 62 adapted to receive the shank of the button, of the feed finger 34 adapted to press the shank of the button firmly into said groove, substantially as described.

19. In a button attaching machine, the combination, with the staple former 55 having the shoulders 57 and 58, of a reciprocating plunger 65 provided with the slot 66 and having a bearing within the staple former 55 but operating independently thereof, a reciprocating die 60 adapted to move in horizontal directions centrally of said former and provided with the projecting lip 61 corresponding in shape to the inside of the finished staple and with a groove for receiving the shank of the button, a reciprocating cam block having in its face a cam-groove, a bell-crank lever pivotally supported, one end of which moves in said groove and the other end carries the said former 55 and imparts a downward movement thereto for cutting off and bending said staple and an upward movement for closing in and holding the legs of said staple while the staple wire is held between said plunger 65 and die 60, and means for horizontally reciprocating said die for withdrawing the same before the final descent of the plunger for setting the staple and for returning the die after such setting action has taken place, substantially as described.

20. In a button attaching machine, the combination, with the staple former 55, of the bell-crank lever 80, and the vertically reciprocating cam for operating said bell-crank lever, substantially as described.

21. In a button attaching machine, the combination, with the plunger 65, the bell-crank 67 connected with said plunger, a vertically reciprocating cam block provided with a cam groove in its face which engages with and operates said bell-crank lever, and a rib or guide for said cam block, substantially as described.

22. In a button attaching machine, the combination, with the cam block 8, lever 67, and plunger 65 actuated thereby, of the rod 71 passing through said cam block and through the lever 67, and provided with nuts on its upper and lower ends, whereby, when the cam block strikes the nut on the lower end of said rod 71, pressure is communicated directly to the plunger 65, substantially as described.

23. In a button attaching machine, the combination, with a cam operated by the movement of a foot lever, and button and wire feeding and staple forming devices actuated by the movements of said cam, of a plunger for thrusting the staple through the fabric and against a clinching die, said plunger being actuated by the movement of said cam during the thrusting operation, and means for bringing the pressure of the foot lever directly upon said plunger during the clinching operation, thus forcing the points of the staple against the clinching die and clinching the staple by the direct action of the foot lever, substantially as described.

24. In a button attaching machine, the combination, with a foot lever or other suitable means for operating the machine, a cam block suitably guided, and means for connecting said foot lever and cam block for causing said cam block to be reciprocated by the motion of the foot lever, of button feeding, wire feeding, and staple forming mechanisms caused to operate by the reciprocation of the cam block, whereby wire is fed through the eye of a button and formed into a staple, a plunger likewise operated by the reciprocation of the cam block for driving the staple through the fabric to which the button is to be affixed and against a clinching die, and a rod 71 passing through the cam block and lever 67 and having nuts on its ends, whereby the clinching operation is performed by the direct pressure of the foot lever, substantially as described.

25. In a button attaching machine, the combination, with the staple former 55, of the lever 80 pivotally connected to said staple former, the cam block 8 having the zig-zag cam groove 81 for actuating said lever 80 and staple former 55, and the spring 62 for adjusting the stroke of the staple former to the thickness of the fabric, substantially as described.

26. In a staple forming mechanism, the combination, with the staple forming die, of a reciprocating staple former 55 having shoulders 57 for bending the fastener wire over the die during the downward movement of the staple former, and other shoulders 58 for pressing in the legs of the staple during the upward movement of the staple former and a cam 8 for reciprocating said staple former, whereby said staple former is caused first to descend and bend the staple over the staple forming die 60, then rise, thus pressing in the legs of the staple, and then descend with the staple when the latter is thrust through the fabric, thus guiding the staple during the thrusting and clinching operations, substantially as described.

27. In a staple forming mechanism, the combination, with a staple forming die 60 and a plunger 65 adapted to shape the top of the staple and thrust the staple through the fabric, of the staple former 55, the lever 80 connected therewith, and the cam block 8 having the zigzag groove 81, whereby the staple former is caused to descend and bend the staple over the staple forming die 60, then rise, thus pressing in the legs of the staple, and then descend with the plunger 65 when the latter drives the staple through the fabric, thereby guiding and supporting the staple during the thrusting and clinching operations, substantially as described.

28. In a button attaching machine, the combination, with a cam having cam grooves in its faces, button feeding and attaching mechanism actuated by pins working in said grooves, and a foot lever or other suitable means for operating said cam, of ratchet teeth on the frame of the machine and a double pawl carried by the cam and adapted to engage with said ratchet teeth, and means for reversing said pawl when the cam reaches the end of its normal travel, substantially as described.

29. In a button attaching machine, the combination, with the cam block 8 having in its faces cam grooves for operating the button and wire feeding, staple forming, and button attaching mechanisms, and the foot lever 6 or other suitable means for causing said cam block to reciprocate, of the guide 12 having in its edge notches 73, the double ratchet or dog 75 engaging therewith and mounted upon a shaft having bearings within the cam block, the tumbler 76 likewise secured to the said shaft, and the lugs 78 and 79 located at the ends of the stroke of the cam block and adapted to engage the tumbler 76, whereby, when the cam block reaches the end of its stroke, the ratchet 75 is reversed, substantially as described.

30. In a button attaching machine, the combination, with the reciprocating cam 8 having in its side a cam groove 81 and the staple former 55 actuated by a traveler working in said groove, and means for causing said cam block 8 to reciprocate, of ratchet teeth on the frame of the machine and a double pawl carried by said cam block and adapted to engage with said ratchet teeth, and means for reversing said pawl, when the cam block reaches the end of its normal stroke, substantially as described.

31. In a button attaching machine, the combination, with a reciprocating cam block 8 having in its side a cam groove 68, the plunger 65 actuated by a pin working in said groove, and means for causing said cam block to reciprocate, of ratchet teeth on the frame of the machine and a double pawl carried by said cam block and adapted to engage with said ratchet teeth, and means for reversing said pawl when the cam block reaches the end of its normal stroke, substantially as described.

In testimony whereof I affix my signature in presence of two witnesses.

WILLIAM E. ELLIOTT.

Witnesses:
S. W. BRAINERD,
H. B. HAWLEY.